June 3, 1930.  R. C. ZUCKERMAN  1,761,286
POTATO DIGGING MACHINE
Filed Feb. 21, 1927   3 Sheets-Sheet 1
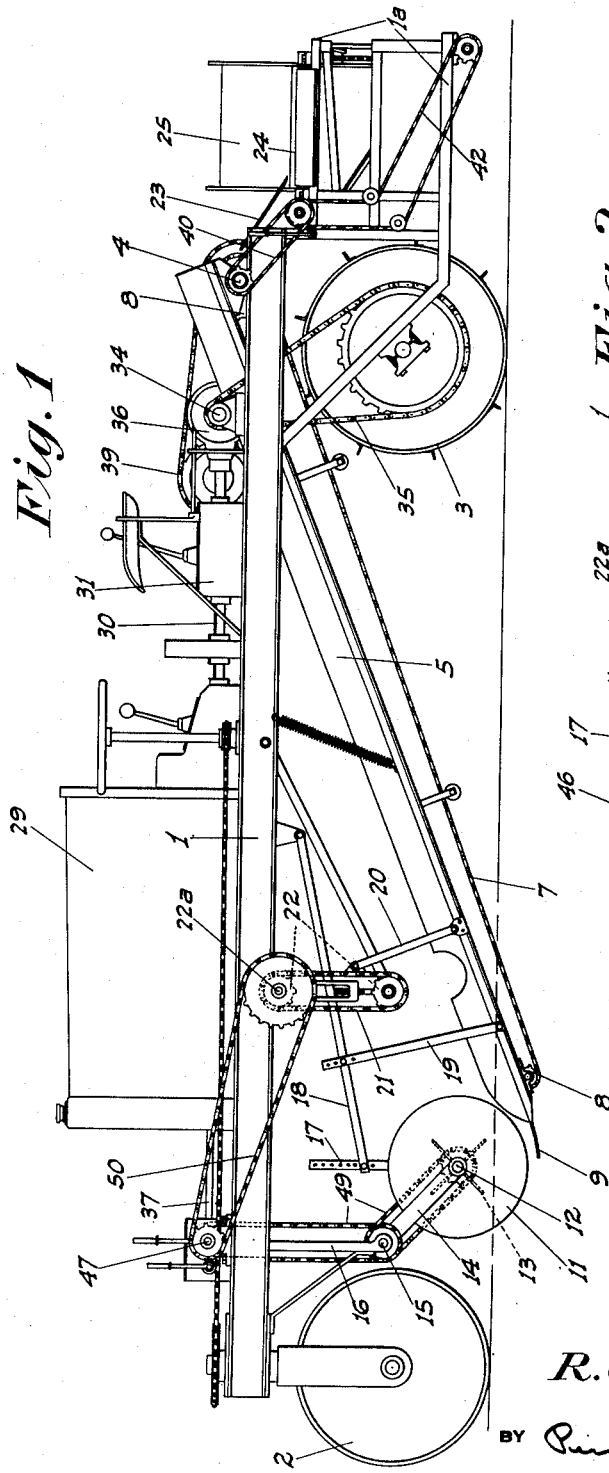
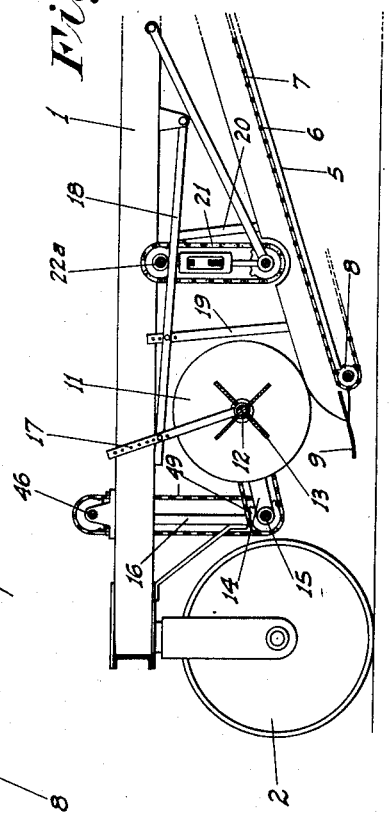
INVENTOR
*R.C. Zuckerman*
BY
ATTORNEY

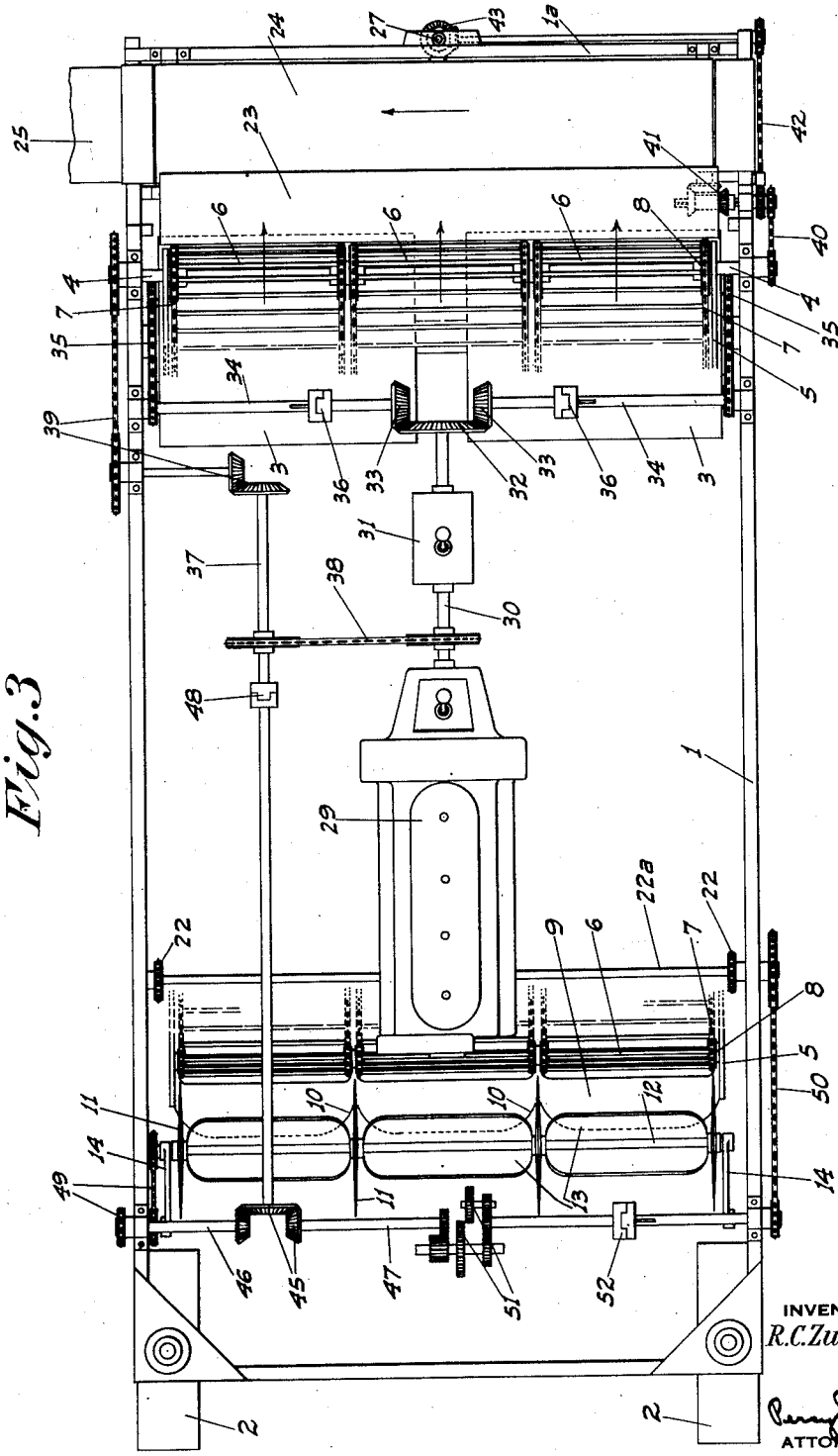

June 3, 1930. R. C. ZUCKERMAN 1,761,286
POTATO DIGGING MACHINE
Filed Feb. 21, 1927    3 Sheets-Sheet 3
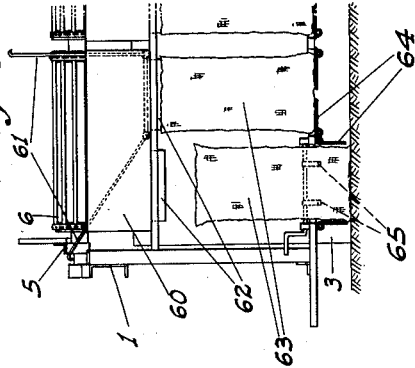
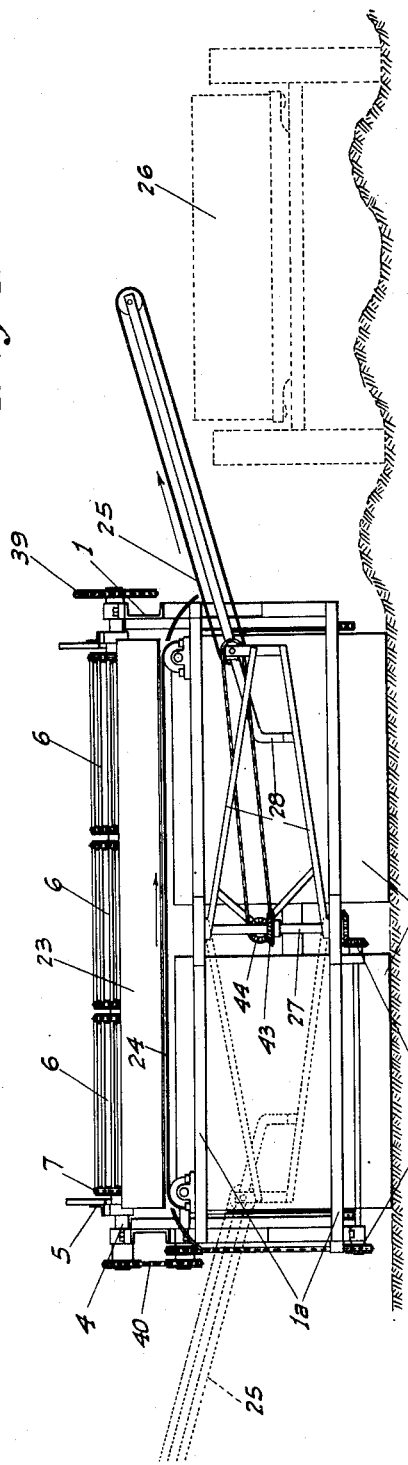
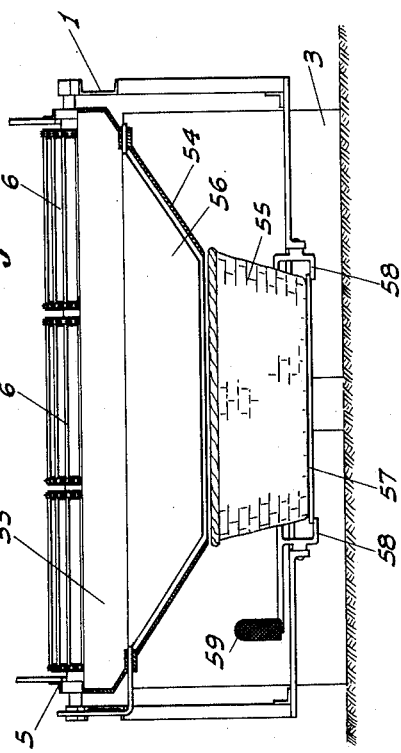
INVENTOR
R.C. Zuckerman
BY
ATTORNEY Patented June 3, 1930

1,761,286

UNITED STATES PATENT OFFICE

ROSCOE C. ZUCKERMAN, OF STOCKTON, CALIFORNIA

POTATO-DIGGING MACHINE

Application filed February 21, 1927. Serial No. 169,686.

This invention relates to improvements in potato digging machines. Such machines as are now in use are pulled by tractors or draft animals and sometimes have small motors mounted thereon to operate the digging and separating mechanisms. One of the main objects of my invention is to provide a self-propelled machine for the purpose in which not only are the digging and other mechanisms driven by power but the machine itself is propelled by the same power plant as is used to operate the other features.

Also the present machines are only capable of digging one row of potatoes at a time. Another object of my invention therefore is to provide a machine for the purpose so arranged that a number of rows of potatoes will be dug simultaneously while at the same time the potatoes from all the rows thus dug are delivered onto a common conveyor or hopper at the rear end of the machine.

With all previous machines great friction is developed between the blade and the potatoes and dirt passing over the same. This inevitably results in causing some of the potatoes to slide off to the sides of the blades so that they will remain on the ground and will not be fed to and raised by the conveyor associated with the blade. Efforts have been previously made to overcome this friction so as to prevent the potatoes thus dropping off but without success until the advent of my improved structure as herein set forth.

Still another object of my invention therefore is to provide means mounted in connection with the digging blade for positively eliminating this deleterious friction so that no dirt can accumulate or pile up at the sides of the blades and all the potatoes in the dirt in the line of movement of the blade will pass over the same and onto the conveyor without any tendency to fall off to the sides of said blade. The previous losses either of potatoes or in time and expense necessary to go back over the ground to salvage such potatoes is therefore eliminated.

A further object of the invention is to provide a draper and conveyor arrangement at the rear end of the machine so arranged that the potatoes from all the rows as dug may be discharged directly into a wagon moving alongside the digger on either side of the same as may be desired or most convenient.

To any one acquainted with the industry and the problems now encountered it will therefore be obvious that my improved machine represents a great advance over present structures and enables digging operations to be greatly facilitated and speeded up with a minimum use of power and number of manual operators.

These objects I accomplish by means of such structure and relative arrangement of parts as will fully appear by a perusal of the following specification and claims.

In the drawings similar characters of reference indicate corresponding parts in the several views:

Fig. 1 is a side elevation of my complete apparatus showing the digging structure in operating position.

Fig. 2 is a fragmentary sectional elevation of the same showing the digging structure raised.

Fig. 3 is a top plan view of the machine to show the power drive features, certain of which are shown diagrammatically or conventionally.

Fig. 4 is a rear end view of the machine with the preferred form of potato discharge mechanism.

Fig. 5 is a rear end view of the machine showing a modified form of discharge mechanism.

Fig. 6 is a similar fragmentary view showing another modified form of discharge mechanism.

Referring now more particularly to the characters of reference on the drawings, the numeral 1 denotes a rectangular horizontal frame structure supported at its front end by one or more steerable wheels 2, disposed so as to ride between rows of potatoes; and at its rear end by wide faced wheels or rollers 3 similar to and for the same purpose as shown and described in my Patent No. 1,739,960, dated Nov. 26, 1929.

Turnably mounted on a transverse shaft 4 journaled on the frame adjacent its rear end and over the rollers 3 is a conveyor frame 5 depending downwardly and forwardly thence toward the ground. The frame supports an endless conveyor structure consisting preferably of transverse and spaced rods 6 mounted on side chains 7 which turn on sprocket wheels 8 mounted at the opposite ends of the frame. The conveyor structure is preferably divided into a plurality of transversely separated but closely spaced flights or sections, the total width of which is sufficient to span a plurality of rows of potatoes. Three such sections are shown but a greater or lesser number may be used, as will be evident.

Mounted on and projecting forwardly from the lower end of the conveyor frame is a continuous transverse blade 9 arranged to deliver onto the adjacent end of the conveyor. This blade in the longitudinal plane of the division between the different conveyor sections, and at the sides of the same is curved or notched rearwardly as at 10 so that said blade is also practically divided into the same number of transverse sections as the conveyor, each section being longitudinally alined with a row of potatoes being dug. Positioned in longitudinal alinement with the sides and division points of the blade just over and partially ahead of the same are vertical coulter discs 11, which are fixed on a common transverse shaft 12. Between the discs and also fixed on said shaft are radial beater boards 13, which are of smaller radial length than the discs and extend practically the full space between the same. These discs are driven at a high speed relative to the forward movement of the machine, as will be hereinafter seen, and act to cut through the dirt to the side edges of the blade sections as such dirt is raised up by the forward movement of the upwardly sloping blade. The beater boards rotating with the discs prevent the dirt from piling up on the blade and cause such dirt to be continuously moved rearwardly and onto the conveyor. The space between the beaters and the blade is sufficient to enable the potatoes to pass freely therebetween without interference and without danger of being struck or mutilated. As a result of this arrangement the usual friction at the blade is eliminated and there is no tendency for the dirt to form a mound on the blade, which causes the potatoes in such dirt to roll off to the sides of the blade.

The shaft 12 is mounted on arms 14 which extend forwardly to pivotal connections with a shaft 15 which is supported by standards 16 depending from the frame 1. Said shaft 12 is also supported from the conveyor frame in a fixed but adjustable position vertically relative thereto by means of links 17 projecting upwardly from the shaft 12. Longitudinal bars 18 connected at their forward ends to the links 17 for vertical adjustment thereon extend rearwardly thence to pivotal connections with the frame 1. Links 19 pivoted at their lower ends onto the conveyor frame extend upwardly thence to pivotal connections with the bars 18 intermediate their ends. By means of this arrangement the coulter discs may be set at different vertical positions relative to the blade, and when the latter is raised or lowered the discs will be raised or lowered likewise.

The links 17 and 19 have a plurality of bolt-holes therealong, as shown in Fig. 1, in any one of which the connecting bolt between the bars 18 and said links may be placed. This permits the normal spacing of the discs relative to the blade 9 to be altered to suit different conditions, without affecting the holding of these parts in the same relationship to each other when the conveyor is raised or lowered.

The conveyor is thus raised or lowered by means of rigid vertical arms or links 20 pivoted at one end onto the sides of the frame 5 and extending upwardly to pivotal connections with one vertical run of endless chains 21. These chains pass about vertically spaced sprocket wheels 22 supported from the frame 1, the upper sprocket wheels being mounted on a transverse shaft 22ª.

All the conveyor sections at their upper rear ends discharge onto a common apron 23 which in turn delivers onto a transversely extending driven draper 24 of the endless belt or other suitable type, which is mounted on a rear extension 1ª of the main frame 1. This draper at one end discharges onto a transverse endless conveyor 25 of suitable type, which is disposed with one end under the draper and projects thence beyond one side of the machine with an upward slope so that its upper end may overhang and discharge into a wagon 26 moving alongside the machine (see Fig. 4). This conveyor is supported from and is turnable about a vertical shaft 27 located centrally of the width of the machine and supported from the frame 1ª by means of a rigid frame and brace or bracket arrangement 28 extending between said conveyor and the shaft and turntable on the latter. This enables the conveyor 25 to turn through a 180 degree arc so that it may receive material from either end of the draper 24.

Various driving arrangements from the power plant 29 on the machine to the different shafts, the main rollers and the conveyors may of course be employed, but I preferably utilize the following.

Said power plant being considered as being a gas engine as usual, its propeller shaft 30, besides having the usual clutch adjacent the engine, has a transmission mechanism indicated at 31 interposed therein. The shaft 30 at its rear end terminates in a bevel gear 32 which meshes with right angle bevel pinions 33 connected to transverse and separate shafts 34 which are journaled on the frame 1. The shafts 34 at their outer ends are connected in driving relation with the rollers 3 by chain drives 35; clutches indicated conventionally at 36 being interposed in the shafts 34 so as to enable the drive to either roller to be discontinued at will.

Disposed parallel to the shaft 30 to one side of the power plant is another shaft 37 which is connected in driving relation with the shaft 30, between the engine and the transmission by a chain or similar drive 38. At its rear end the shaft 37 is connected in driving relation with one end of the conveyor shaft 4 by a combination gear and chain drive arrangement 39. The other end of the shaft 4 is connected in driving relation with one end of the draper 23 by a combination chain and gear drive arrangement 40, which has a reversing mechanism 41 interposed therein so that the direction of movement of the draper may be reversed without altering the direction of movement of the main conveyor. This enables the draper to deliver onto the conveyor 25 when the latter is shifted from one side of the machine to the other. The shaft 27 is driven from the driving arrangement 40 ahead of the reversing mechanism by a combined chain and gear drive arrangement 42. This driving mechanism and the frame extension 1ª are so arranged as not to interfere with the freedom of swinging of the conveyor 25 from one side of the machine to the other. The conveyor 25 is itself driven from the shaft 27 by a suitable means which includes a bevel gear 43 fixed on the shaft 27 and a bevel pinion 44 engaging this gear and mounted on the supporting structure 28, so that the pinion is free to turn about the shaft 27 as an axis.

The forward end of the shaft 37 is connected by gearing 45 in driving relation with separate transverse shafts 46 and 47, a clutch 48 being interposed in the shaft 37 ahead of the driving mechanism 38. The shaft 46 is connected in driving relation with the coulter shaft 12 by a chain drive 49, the drives to said shaft and that to the roller 3 being so proportioned that the speed of the discs will be considerably in excess of the forward movement of the machine. The shaft 47 is connected at its outer end in driving relation with the shaft 22 by a chain drive 50, a reversing mechanism 51 and a clutch 52 being interposed in the shaft 47, so that the direction of rotation of the shaft 22ª may be reversed at any time, or its operation halted without interfering with the continued operation of the other mechanisms of the machine.

If desired, without altering the other parts of the machine, the rear transverse draper and conveyor may be omitted and its place taken by a hopper 53 into which all the conveyor sections discharge in common, as shown in Fig. 5. The lower end of this hopper terminates in a discharge funnel or spout 54 so as to empty into a basket 55 positioned thereunder. A hand controlled swivel shutter or deflector 56 is positioned in the spout so that the flow can be cut off when the basket is being changed. The basket is supported upon a depressible platform 57 normally held in its raised and supporting position by catches 58 arranged to be released by a foot pedal 59.

Also if desired I may use the arrangement the same as that shown in my Patent No. 1,639,832, dated Aug. 23, 1927. This arrangement, as shown in Fig. 6, comprises essentially a hopper 60 for each conveyor section, with a reversible deflector plate arrangement 61 therein to guide the potatoes falling into the hopper into one or the other of a pair of transversely spaced nozzles or outlets 62. These outlets are adapted to fit into the mouths of sacks 63 normally supported on hinged and depressible platforms 64. These platforms are held raised when supporting the sacks by foot released catches 65 which when released allow the weight of the sacks to depress the platforms so that the sacks may slide vertically onto the ground.

Either of the above methods may be very successfully used with this machine, since the ground rearwardly of the machine and in the path of digging operations is smoothed down subsequent to such operations by the rollers 3, so that the baskets or sacks will readily rest in an upright position without danger of the potatoes spilling out.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A potato digger comprising a frame structure arranged to move along the ground, a digging structure mounted on the frame including a transverse blade and a conveyor leading upwardly therefrom; vertical longitudinally disposed driven cutting discs at the ends of the blade above and partially ahead of the same, means for raising and lowering the forward end of the conveyor to raise and lower the blade, means supporting the discs from the frame, and means between the conveyor and discs for causing the latter to be raised and lowered with the conveyor.

2. A potato digger comprising a frame structure arranged to move along the ground, a digging element, a conveyor onto which said element delivers and sloping upwardly and rearwardly thence, a horizontal transverse draper onto which the conveyor delivers at its rear end, a transverse conveyor disposed below the draper and projecting beyond one end of the same to one side of the machine, said draper being arranged to deliver onto said transverse conveyor, and means permanently but flexibly supporting the transverse conveyor in a manner to enable the same to project beyond either side of the machine to receive produce from either end of the draper.

3. A potato digger comprising a frame structure, a digging structure including a transverse blade of a width to simultaneously dig a plurality of rows of potatoes, a plurality of transversely separated conveyors each cooperating with the digging blade to receive the diggings from a single row of potatoes, a plurality of longitudinally disposed cutting discs adjacent the cutting blade and each in substantial alinement with a side edge of one of the conveyors whereby with the progress of the digging operation such discs will concentrate the diggings from each row directly in line with its corresponding conveyor.

4. A structure as in claim 3, and means extending the full distance between adjacent discs to move the concentrated diggings upon the conveyors.

5. A potato digger comprising a frame structure, a digging structure including a conveyor pivoted to the frame and having a digging blade at its lower end, spaced discs pivoted in connection with the frame and operating adjacent the digging blade, means for moving the conveyor about its pivot, means to adjust the position of the discs relative to the conveyor, and means to maintain the position of the discs constant relative to the conveyor as the latter is moved on its pivotal connection with the frame.

6. A potato digger comprising a frame, a digging structure including a conveyor pivoted to the frame and having a digging blade at its lower end, and means to move the conveyor on its pivoted point including an endless driven chain on the frame, and a rigid link connected to the conveyor and to the chain.

7. A potato digger comprising a frame, a digging structure including a conveyor pivoted to the frame and having a digging blade at its lower end, the conveyor comprising a series of transversely separated driven flights, the digging blade being a single member extending across the lower end of all of the flights and provided with a notch in its front edge in line with each of the side edges of each set of adjacent flights, and means operating adjacent each notch to concentrate the diggings of the blade between the notches in front of the immediately adjacent conveyor flight.

8. A potato digger including a frame, a conveyor structure pivoted at one end on the frame and having a digging blade on its lower end, an upwardly angled arm pivoted at its upper end in connection with the frame, discs carried by the lower end of the arm in proximity to the blade, a link extending upwardly from the arm, a substantially horizontal bar pivoted to the frame and to the link, and another link pivoted to the conveyor and to the bar.

9. A potato digger comprising a frame structure adapted to move along the ground, a digging structure mounted on the frame and including a transverse blade and a conveyor extending rearwardly therefrom; vertical and longitudinally disposed cutting discs at the ends of the blade above and partially ahead of the same to concentrate the dirt as dug between the discs; and beater boards radial relative to the axial line of the discs mounted in connection therewith and extending substantially the full distance therebetween.

In testimony whereof I affix my signature.

ROSCOE C. ZUCKERMAN.